J. C. FLEMING.
STORAGE AUTOMATIC RAREFIER.
APPLICATION FILED MAY 24, 1915.

1,192,614.

Patented July 25, 1916.

Witnesses:

Inventor
John C. Fleming

UNITED STATES PATENT OFFICE.

JOHN C. FLEMING, OF BOSTON, MASSACHUSETTS.

STORAGE AUTOMATIC RAREFIER.

1,192,614.     Specification of Letters Patent.   Patented July 25, 1916.

Application filed May 24, 1915. Serial No. 30,244.

*To all whom it may concern:*

Be it known that I, JOHN C. FLEMING, a citizen of the United States, and resident of Boston, in the county of Suffolk and State of Massachusetts, have invented certain new and useful Improvements in Storage Automatic Rarefiers, of which the following is a specification.

This invention is an apparatus for treating atmospheric air to produce cool, pure, dry air, suitable for general ventilating and drying purposes.

One of the objects of the invention is to provide an apparatus in which the air to be purified is caused to enter a receiving chamber, and to pass therefrom into suitable delivery domes, the lower edges of which are sealed by a purifying and cleansing liquid, through which the air must pass in its transfer from the receiving chamber to the delivery domes.

A further object is to control the volume of air passing from the receiving chamber to the delivery domes, whereby the quantity of purified air delivered by the apparatus may be regulated to suit the conditions required.

A further object is to provide means whereby excessive or accumulated pressure within the chamber being supplied with purified air by means of the invention, may be automatically relieved.

The invention will be hereinafter fully set forth and particularly pointed out in the claims.

Figure 1:
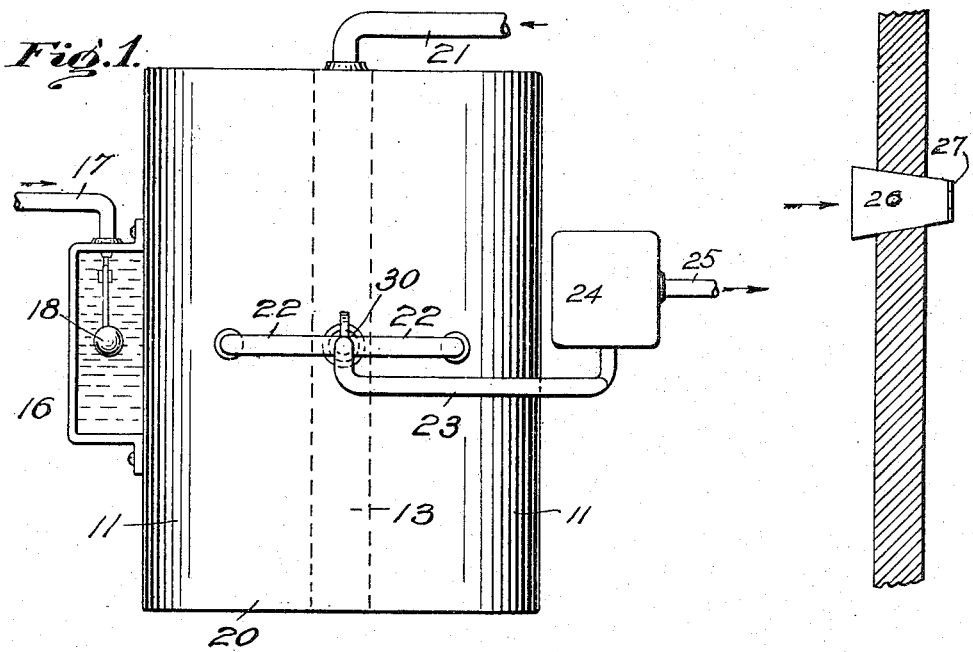
Figure 2:
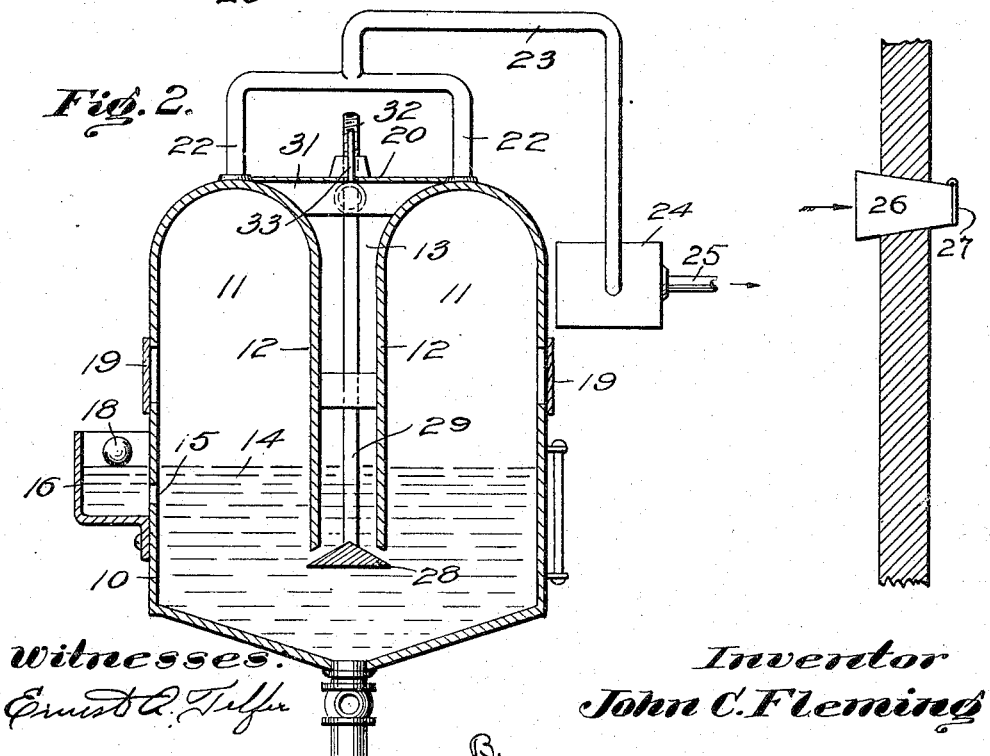

In the accompanying drawing: Figure 1 is a plan of an apparatus embodying the invention, the wall of the inclosure or space to be supplied with purified air, being illustrated in section. Fig. 2 is a vertical transverse sectional view of the said apparatus.

Referring to the drawing, the air purifying apparatus comprises a tank 10, having domes 11, attached thereto in suitable manner, the inner sides 12 of the domes being spaced from each other, as illustrated in Fig. 2, to provide an air-receiving chamber 13. It will be noted that the bottom edges of the inner sides 12 of the domes, are spaced from the bottom of the tank 10, and are submerged in a cleansing and purifying liquid 14. This liquid is preferably an alkaline solution, such as potassium carbonate, and is introduced into the tank 10, through an opening 15, leading from an auxiliary supply trough 16, which receives its supply through a pipe 17. The flow of liquid from pipe 17 into the tank 16, is automatically controlled by a float valve 18. If desired, hand holes 19, having suitable covers, may be provided, to permit of the convenient cleaning out of the tank 10, when necessary or desirable.

The top of the air chamber 13 is closed by a cover 20, the edges of which rest upon and are attached to the domes 11, and air is introduced into said chamber by means of an air inlet pipe 21, leading from any suitable point. Air delivery pipes 22, attached to the tops of the domes 11, conduct the air from said domes to a main delivery conduit 23, connected with an air pump 24, of any preferred construction. The pump is illustrated conventionally as of the rotary blower type, but it is obvious that any other style, type or form of pump may be substituted therefor. When the pump is in operation, air is displaced thereby so as to create a partial vacuum in each dome 11, a condition which causes atmospheric pressure to force air through the inlet pipe 21 into the air chamber 13, and from thence through the liquid 14, beneath the walls 12, and into the domes 11. From the said domes, the purified air is drawn and discharged through the pipes 22 into the pipe 23, and delivered by the discharge pipe 25 of the pump, into the space to be supplied with purified air, in this instance a room. As shown, the wall of the room is provided with ventilators 26, communicating with the outside atmosphere, and closed by gravity-operated gates or valves 27, so arranged that should the pressure within the room become too great, because of the discharge of air into the room through the action of the pump, the excess pressure will cause the gates 27 to open, and permit escape of sufficient air to maintain the pressure within the room at the normal atmospheric pressure.

The volume of air passing from the air chamber 13, into the domes 11, and consequently the degree of rarefication of the air in the domes is regulated by means of a valve 28, attached to a rod 29, passing through a suitable boss 30, supported by a cross bar 31, spanning the space between the domes 11. The upper end of said rod is screw threaded, as indicated at 32, and said threaded portion is engaged by a suitable thumb nut 33, bearing against the top of the cross bar 31, whereby the valve and rod are adjustably supported. The valve 28 is of approximately triangular cross section, the upper beveled faces thereof coöperating with the lower edges of the walls 12, which perform the functions of a valve seat. By adjusting the nut 33, the valve 28 may be moved toward or away from the bottom edges of the walls 12, and the volume of air passing between said valve and the said walls will be varied in accordance with the position of said valve relative to said edges.

Having thus explained the nature of my invention, and described an operative manner of constructing and using the same, although without attempting to set forth all of the forms in which it may be made, or all of the forms of its use, what I claim is:—

1. An apparatus for purifying air comprising a receptacle provided with spaced apart domes having their lower edges sealed within an air cleansing solution, an air-receiving chamber being provided between said domes above said solution, means for causing air to pass from said receiving chamber into said domes through said solution, and means submerged in said solution for controlling the volume and degree of rarefication of air passing from said air-receiving chamber to said domes.

2. An apparatus for purifying air comprising a receptacle provided with spaced apart domes, the inner sides of the domes being spaced from each other to form an air receiving chamber, the bottom edges of said sides being spaced from the bottom of the receptacle and submerged within an air cleansing solution, means for introducing air into said chamber, means for withdrawing air from said domes, and means submerged in said solution and coöperating with the inner sides of the domes to control the volume and degree of rarefication of air passing through the apparatus.

3. An apparatus for purifying air comprising a receptacle provided with spaced apart domes, the inner sides of the domes being spaced from each other to form an air receiving chamber, the bottom edges of said sides being spaced from the bottom of the receptacle and submerged within an air cleansing solution, means for introducing air into said chamber, means for withdrawing air from said domes, a valve submerged in said solution and coöperating with the inner sides of the domes to control the volume and degree of rarefication of air passing through the apparatus, and means for adjusting said valve.

4. An apparatus for purifying air comprising a receptacle provided with spaced apart domes, the inner sides of the domes being spaced from each other to form an air receiving chamber, the bottom edges of said sides being spaced from the bottom of the receptacle and submerged within an air cleansing solution, means for introducing air into said chamber, means for conducting air from said domes, a valve submerged in said solution and closing the bottom of said air chamber, a stem attached to said valve and passed through said air chamber, and means coöperating with said stem to vary the position of said valve.

5. An apparatus for purifying air comprising a receptacle provided with spaced apart domes having their lower edges sealed within an air cleaning solution, an air-receiving chamber being provided between said domes above said solution, means for causing air to pass from said receiving chamber into said domes through said solution, means submerged in said solution for controlling the volume and degree of rarefication of air passing from said air-receiving chamber to said domes, an auxiliary trough for supplying the solution to said receptacle, and means for automatically maintaining a uniform depth of said solution within said auxiliary trough.

In testimony whereof I have affixed my signature.

JOHN C. FLEMING.

Copies of this patent may be obtained for five cents each, by addressing the "Commissioner of Patents, Washington, D. C."